No. 833,718. PATENTED OCT. 16, 1906.
M. HARVEY.
STEERING GEAR FOR AUTOMOBILES.
APPLICATION FILED JAN. 3, 1906.

2 SHEETS—SHEET 1.

No. 833,718. PATENTED OCT. 16, 1906.
M. HARVEY.
STEERING GEAR FOR AUTOMOBILES.
APPLICATION FILED JAN. 3, 1906.

2 SHEETS—SHEET 2.

Witnesses:

Inventor:
Minor Harvey

UNITED STATES PATENT OFFICE.

MINOR HARVEY, OF PHILADELPHIA, PENNSYLVANIA.

STEERING-GEAR FOR AUTOMOBILES.

No. 833,718.　　　　Specification of Letters Patent.　　　　Patented Oct. 16, 1906.

Application filed January 3, 1906. Serial No. 294,455.

*To all whom it may concern:*

Be it known that I, MINOR HARVEY, of the city and county of Philadelphia and State of Pennsylvania, have invented an Improvement in Steering-Gear for Automobiles, of which the following is a specification.

My invention has reference to steering-gear for automobiles; and it consists of certain improvements, which are fully set forth in the following specification and shown in the accompanying drawings, which form a part thereof.

The object of my invention is to provide a construction of steering or controlling gear suitable for automobiles and other appliances which shall be positive in action, durable in use, and eliminate objectionable lost motion and backlash.

In automobiles the steering-gear is required to withstand great strains, especially in traveling at high speed on curves or when the steering-wheels strike obstructions in the roadway. To guard against damages due to torsional strains shifting the steering-wheel and its shaft on the gearing under these conditions of great duty is one of the objects of my invention. To guard against lost motion or backlash on the gearing and consequent unsteady steering is another of the specific objects of my invention.

My invention consists of certain improvements in the bearings of the gearing and the connection of the worm-gear with the steering-shaft, as are more fully set forth in the specification hereinafter.

My invention further consists of many details of construction, which, together with the features first mentioned, will be better understood by reference to the drawings, in which—

Figure 1:
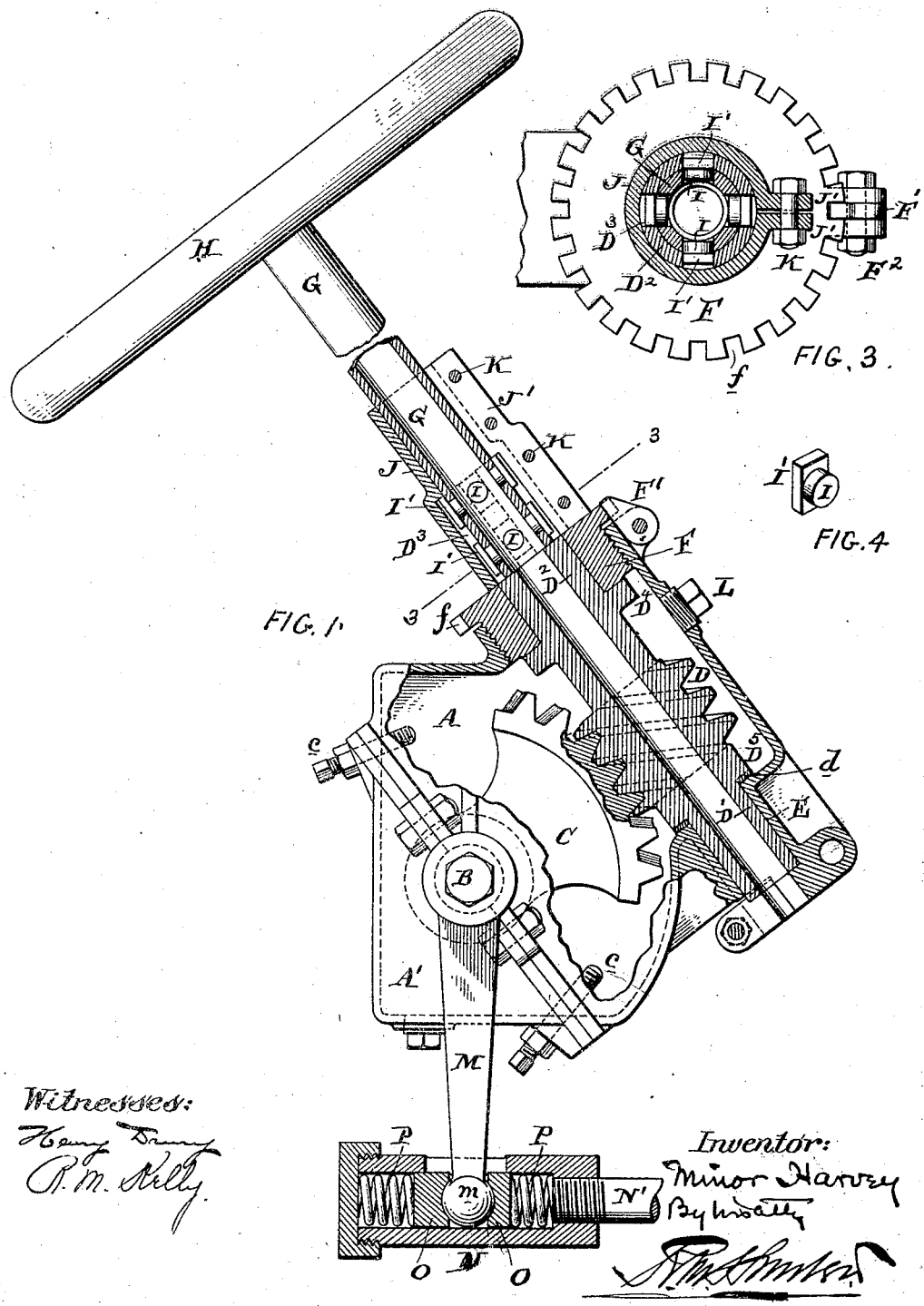
Figure 2:
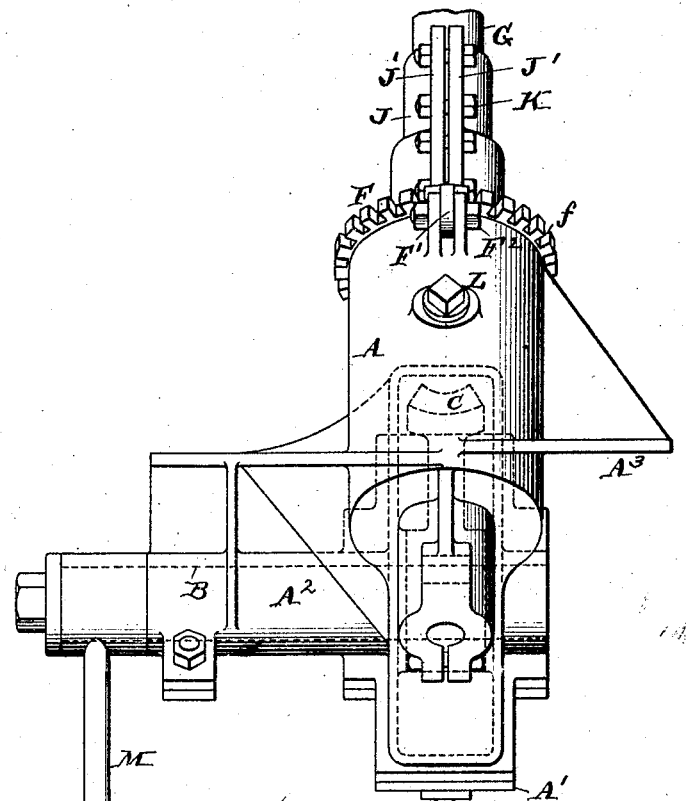
Figure 5:
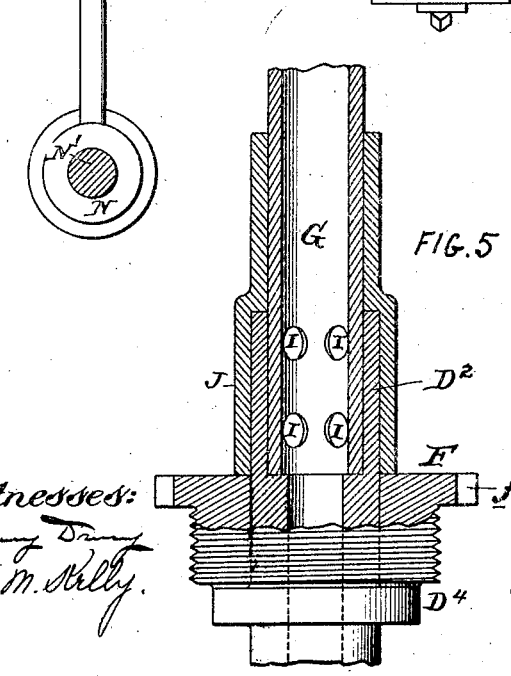
Figure 6:
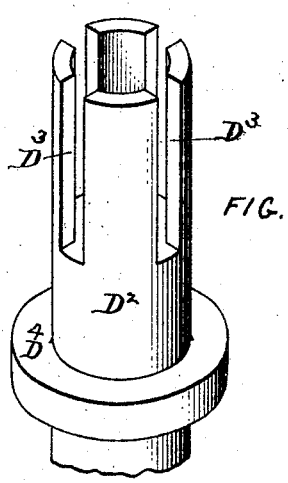

Figure 1 is a side elevation with part in section of a steering-gear embodying my invention. Fig. 2 is a front elevation of the same. Fig. 3 is a cross-section of a portion of same on line 3 3 of Fig. 1. Fig. 4 is a perspective view of one of the keys for locking the shaft to the worm. Fig. 5 is a sectional elevation of the connection of the worm with the steering-shaft, and Fig. 6 is a perspective view of the upper end of the worm-bearing.

A is the main box or case and has a detachable lower portion A', which when bolted in position as shown forms a bearing A² for the transverse shaft B, to which the worm-wheel C is secured. Adjustable stops $c\ c$ in the case limit the possible oscillation of the worm-wheel C. The worm D, meshes with the worm-wheel C and has a lower journal or neck D' journaled in the bearing E in the lower part of the case. It further has a shoulder $D^5$ to take up end thrust and may rest against an annular washer $d$ to receive the wear and protect the bearing E. When excessive wear takes place, the washer may be renewed by a thicker washer. The upper end of the worm D is provided with a journal $D^2$ and a collar $D^4$, working in connection with an adjustable bearing F. This bearing F screws into the open end of the case A, as shown, and is locked in adjusted position by a pawl F' on the case engaging one of the notches $f$ in the flanged rim of the bearing F. The pawl may be clamped in position by a bolt $F^2$, so that it cannot be jarred out of locking engagement. The flanges or shoulders $D^4$ and $D^5$ prevent any end motion to the worm D.

The upper end of the bearing $D^2$ is made tubular and slotted in one or more places, as at $D^3$. (Best shown in Fig. 6.) Fitted down into the tubular end of the bearing $D^2$ of the worm is the steering-wheel shaft G, having the steering-wheel H. Keys I, having rectangular heads I', fit into holes in the shaft G, and the heads I' fit into the slots $D^3$ in the bearings $D^2$ of the worm. In this manner the shaft G and the worm D are positively keyed together, so that they must turn together. Surrounding the tubular extension of the bearing $D^2$ of the worm and also that portion of the shaft G immediately above it is a sleeve J, which is split and provided with flanges J' J'. Bolts K extend through the flanges of the sleeve and tightly clamp the shaft G to the part $D^2$ of the worm. This sleeve also clamps the flexible ends of the slotted part $D^2$ tightly upon the lower end of the shaft G and also may clamp the heads I' of the keys. By this means the joint between the parts G and $D^2$ is very strong and all liability of breaking or of the shaft G slipping in the worm is avoided.

L is a plug which may be removed to introduce oil into the case A for oiling the gears.

The gears are of the type in which the worm fits the teeth of the worm-wheel throughout its length, so that lost motion cannot take place and the wear is reduced to a minimum.

The shaft B extends through the end of the bearing A² and is secured to the arm M, having on its end a ball m, which fits into a cylindrical head N of the connecting-rod N', leading to the sleeving-knuckles, and works against blocks O O and springs P P within said head. The connection of the arm M and the rod N' may be made in any other suitable manner, or the arm M may be employed to operate any other device.

While I have described my invention as adapted to steering-gear for automobiles, it may be employed as controlling-gear for any other purpose for which it may be found adapted.

While I have described what I believe to be the best mode of carrying my invention into commercial use, I do not confine myself to the details, as they may be modified without departing from the spirit of the invention.

Having now described my invention, what I claim as new, and desire to secure by Letters Patent, is—

1. In a steering or controlling device, a case, and a worm-wheel journaled in said case and having an actuating part, combined with a worm meshing with the worm-wheel and journaled at one end in the case and having an upwardly-extending tubular extension, an adjustable bearing at the other end screwed into the case and surrounding the upwardly-extending tubular extension of the worm, an operating-shaft fitting into the tubular extension of the worm, and locking-keys extending through the shaft and extension of the worm for securing them together.

2. In a steering or controlling device, a case, and a worm-wheel journaled in said case and having an actuating part, combined with a worm meshing with the worm-wheel and journaled at one end in the case and having an upwardly-extending tubular extension, an adjustable bearing at the other end screwed into the case and surrounding the upwardly-extending tubular extension of the worm, an operating-shaft fitting into the tubular extension of the worm, locking-keys extending through the shaft and extension of the worm for securing them together, and a sleeve fitting over the tubular extension of the worm and lower end of the operating-shaft.

3. In a steering or controlling device, a case, and a worm-wheel journaled in said case and having an actuating part, combined with a worm meshing with the worm-wheel and journaled at one end in the case and having an upwardly-extending tubular extension, an adjustable bearing at the other end screwed into the case and surrounding the upwardly-extending tubular extension of the worm, an operating-shaft fitting into the tubular extension of the worm, locking-keys extending through the shaft and extension of the worm for securing them together, a split sleeve fitting over the tubular extension of the worm and lower end of the operating-shaft, and means to clamp the split sleeve tightly upon its inclosed parts.

4. In a steering or controlling device, a case, and a worm-wheel journaled in said case and having an actuating part, combined with a worm meshing with the worm-wheel and journaled in the case and provided with an upwardly-extending slotted tubular extension, an operating-shaft fitting within the slotted tubular extension, locking-keys arranged in the slots of the tubular extension and having parts projecting into the operating-shaft, and a sleeve surrounding the tubular extension and locking-keys.

5. In a steering or controlling device, a case, and a worm-wheel journaled in said case and having an actuating part, combined with a worm meshing with the worm-wheel and journaled in the case and provided with an upwardly-extending slotted tubular extension, an operating-shaft fitting within the slotted tubular extension, locking-keys arranged in the slots of the tubular extension and having parts projecting into the operating-shaft, and a sleeve surrounding the tubular extension and locking-keys and extending up around the lower end of the operating-shaft.

6. In a steering or controlling device, a case, and a worm-wheel journaled in said case and having an actuating part, combined with a worm meshing with the worm-wheel and journaled in the case and provided with an upwardly-extending slotted tubular extension, an operating-shaft fitting within the slotted tubular extension, locking-keys arranged in the slots of the tubular extension and having parts projecting into the operating-shaft, a sleeve surrounding the tubular extension and locking-keys and extending up around the lower end of the operating-shaft, and means for clamping the sleeve in position.

7. In a steering or controlling device, a case, a worm-wheel pivoted therein, adjustable stops to limit the oscillations of the worm-wheel in each direction, a worm meshing with the worm-wheel and having a tubular bearing journaled in the case, and a detachable operating-shaft secured to the tubular bearing of the worm.

8. In a steering or controlling device, a gear having a tubular end, an operating-shaft fitting into the tubular end, locking-keys extending through both the tubular end and shaft and a sleeve clamped over the tubular end and shaft.

9. In a steering or controlling device, a gear having a slotted tubular end, an operating-shaft fitting into the tubular end, locking-keys having rectangular heads fitting the slots of the tubular end of the worm and laterally-extending portions engaging the operating-shaft, and a sleeve clamped over the tubular end and shaft and inclosing the locking-keys.

In testimony of which invention I hereunto set my hand.

MINOR HARVEY.

Witnesses:
J. HOWARD MAXWELL,
HARRY FLECKENSTEIN.